United States Patent Office 2,694,174
Patented Nov. 9, 1954

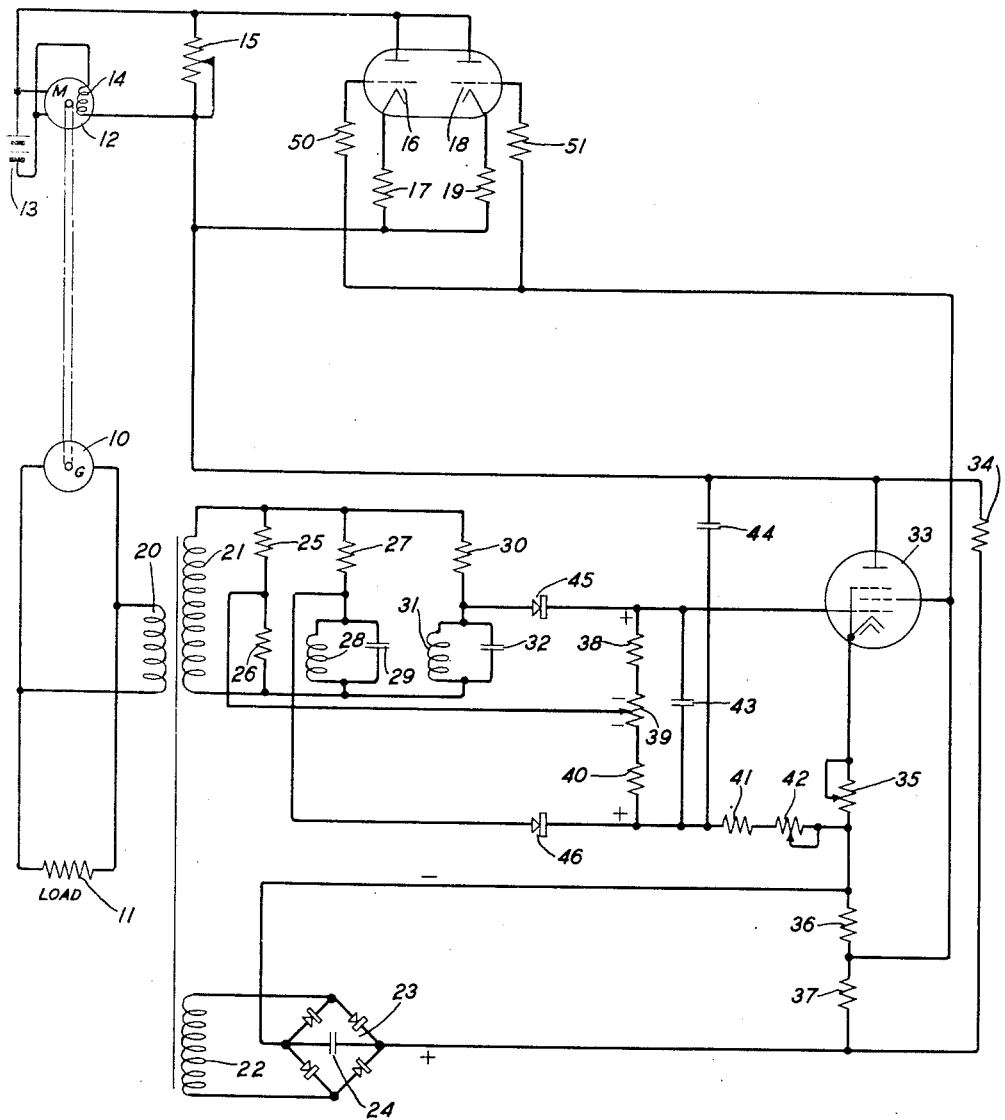

2,694,174

FREQUENCY AND VOLTAGE CONTROL APPARATUS

John R. Stone, West Orange, N. J., assignor to Bell Telephone Laboratories, Incorporated, New York, N. Y., a corporation of New York Application February 18, 1950, Serial No. 145,059

11 Claims. (Cl. 322—32)

This invention relates to frequency and voltage control apparatus and particularly to apparatus for controlling the speed of a motor-driven generator to minimize voltage and frequency variations of the generator output.

An object of the invention is to provide improved apparatus for regulating the speed of a motor-driven generator.

In accordance with an embodiment of the invention herein shown and described for the purpose of illustration, a generator driven by a direct-current motor is provided for supplying alternating current to a load. The motor field winding is supplied with direct current through a variable resistance path comprising a rheostat and, in shunt with respect thereto, the space current path of a space current device or the space current paths in parallel of a plurality of such devices. An alternating voltage derived from the generator output is impressed across a frequency sensitive bridge circuit having three parallel branch paths. A first of these paths comprises two equal resistors in series, a second path comprises in series a resistor and a tuned circuit resonant to a frequency below the normal frequency of the generator output current, and the third path comprises in series a resistor and a tuned circuit resonant to a frequency above the normal frequency of the generator output current. The alternating voltage between the common terminal of the resistors of the first branch path and the common terminal of the resistor and tuned circuit of the second branch path is rectified to produce a first unidirectional voltage component. The alternating voltage between the common terminal of the resistors in the first branch and the common terminal of the resistor and tuned circuit of the third branch is rectified to produce a second unidirectional voltage component. A voltage equal to the difference of the first and second unidirectional voltage components, after amplification, is utilized to control the resistance of the space current device or devices which are connected across the motor field rheostat to control the speed of the motor. In constant load applications, the motor speed and generator output voltage and frequency are thus maintained substantially constant with variations in the voltage of the power supply to the motor. In cases where the load is variable, the motor speed and generator output frequency are maintained substantially constant with changes in load and variations in the voltage of the power supply to the motor even though the load changes may produce considerable changes in the generator output voltage and wave form. Instead of connecting the space current devices across the motor field rheostat, they may be connected across the motor field winding if desired. In this case, however, the connections from the frequency sensitive bridge and rectifiers to the input of the amplifier which controls the space current devices should be reversed.

The invention may be better understood from the following description and the accompanying drawing the single figure of which is a schematic view of a regulating circuit for a motor-generator set embodying the invention.

Referring to the drawing, a generator 10 is provided for supplying to a load 11 alternating current, normally of 110 volts, 60 cycles, for example, when the generator is being driven by a direct-current motor 12. The motor 12 is energized by current from a suitable direct-current source such as a battery 13, current being supplied from battery 13 to a field winding 14 of the motor through a circuit having three parallel branch paths in one of which a rheostat 15 is connected. A second of the branch paths comprises in series the space current path of a triode 16 of a twin-triode type 421A tube, for example, and a resistor 17 of 47 ohms, for example, and the third branch path comprises the space current path of a triode 18 and a resistor 19 of 47 ohms, in series. Of course, a smaller or larger number of paths each comprising a space current path may be used, eight such paths having been used and found to operate satisfactorily. The resistance of the paths comprising triodes 16 and 18 is controlled by means of a variable voltage impressed upon the control grid-cathode circuits of the triodes to control the current supplied to the motor field winding 14 to regulate the speed of the motor.

Connected across the output leads of the generator 10 is the primary winding 20 of a transformer having two secondary windings 21 and 22. Current is supplied from the secondary winding 22 to a varistor bridge rectifier 23 across the output terminals of which is connected a filtering condenser 24 of 200 microfarads capacity, for example. Current is supplied from secondary winding 21 to a frequency sensitive bridge circuit having three parallel branch paths. A first of these paths comprises resistors 25 and 26 in series, each having a resistance of 3,900 ohms, for example. A second of the paths comprises a resistor 27 of 18,000 ohms and in series therewith a tuned circuit resonant to a frequency of about 55 cycles comprising inductance coil 28 and capacitance 29 connected in parallel with respect to each other. The third of the three parallel paths comprises a resistor 30 of 18,000 ohms and in series therewith a tuned circuit resonant to a frequency of about 65 cycles comprising inductance coil 31 and capacitance 32 connected in parallel with respect to each other.

There is provided an amplifier space current device 33 of the 310A type, for example, having its anode connected through a resistor 34 of 220,000 ohms to the positive output terminal of rectifier 23 and having its cathode connected through 100,000-ohm rheostat 35 to the negative output terminal of rectifier 23. A voltage divider resistance path comprising resistors 36 and 37, each of 16,000 ohms is connected to the output terminals of rectifier 23, the common terminal of resistors 36 and 37 being connected to the screen grid of tube 33. The control grid-cathode circuit of tube 33 may be traced from the control grid through resistor 38 of 47,000 ohms, potentiometer 39 of 100,000 ohms, resistor 40 of 47,000 ohms, resistor 41 of 21,000 ohms, rheostat 42 of 100,000 ohms and rheostat 35 to the cathode. A 1-microfarad condenser 43 is connected across the current path comprising resistors 38 and 40 and potentiometer 39. A condenser 44 of 4-microfarad capacity is provided in a current path connecting the anode of tube 33 and the common terminal of resistors 40 and 41. An asymmetrically conducting varistor 45, or other suitable rectifying element, is provided in a path connecting the common terminal of resistor 30 and tuned circuit 31, 32 to the common terminal of resistor 38 and the control grid of tube 33 and a similar varistor or rectifying element 46 is provided in a path connecting the common terminal of resistor 27 and tuned circuit 28, 29 to the common terminal of resistors 40 and 41. The common terminal of resistors 25 and 26 is connected to the variable tap of potentiometer 39. If desired, the current path comprising resistors 25 and 26 may be omitted and the variable tap of potentiometer 39 connected to a tap on transformer winding 21 preferably at or near the mid-point of the winding.

The tuning of the tuned circuits is preferably such that, when the frequency and voltage at the terminals of generator 10 are at normal values, the resonant frequency of tuned circuit 28, 29 is somewhat nearer the generator frequency than is the resonant frequency of tuned circuit 31, 32. Then, with the tap set at the mid-point of potentiometer 39, for example, the current flow through the circuit comprising resistor 27, varistor 46, resistor 40, the lower half of potentiometer 39 and resistor 26 will be somewhat larger than the current flow through the circuit comprising resistor 30, varistor 45, resistor 38, the upper half of potentiometer 39 and resistor 26. The voltage drop across resistor 40 and half of potentiometer 39 will be larger than that across resistor 38 and half of potentiometer 39 and the control grid of tube 33 will be negative with respect to its cathode. The anode current of tube 33 flows through resistor 34. This resistor and resistor 37 are connected in series with each other in the grid-cathode circuits of triodes 16 and 18, the voltage drops across the resistors being in opposition. For the normal frequency of the current from generator 10, the voltage drop across resistor 37 is larger than that across resistor 34 and the grids of triodes 16 and 18 are negative with respect to the cathodes. A resistor 50 is included in the grid-cathode circuit of triode 16 and a resistor 51 is included in the grid-cathode circuit of triode 18, each resistor having a resistance of 100,000 ohms, for example.

When the frequency at the terminals of generator 10 decreases below the normal value, the voltage across tuned circuit 28, 29 increases, the voltage across tuned circuit 31, 32 decreases and the control grid of tube 33 becomes more negative with respect to its cathode with the result that the space current of tube 33 flowing through resistor 34 decreases. The decrease of the voltage drop across resistor 34 results in the grids of triodes 16 and 18, becoming more negative with respect to the cathodes. The resistance of the space current paths of the triodes thus increases to cause a reduction of the current supplied to the motor field winding and the motor speed increases. As the motor speed and the generator output frequency increase, the voltage drop across resistor 34 increases to reduce the negative grid bias of triodes 16 and 18. When the frequency at the generator terminals increases to a value larger than the normal value, the voltage across tuned circuit 31, 32 is larger than the voltage across tuned circuit 28, 29 with the result that the voltage across resistor 38 and half of potentiometer 39 is greater than the voltage across resistor 40 and half of potentiometer 39. The resulting increased space current flowing through resistor 34 causes a voltage drop across it which is larger than the voltage drop across resistor 37, thus making the grids of triodes 16 and 18 positive with respect to their cathodes. The increased current flowing through field winding 14 causes the motor speed to be reduced. Speed variations of the driving motor 12 and, therefore, resulting frequency variations of the output of generator 10, are thus minimized. The ratio of the two opposed voltage components set up in the current path comprising resistors 38 and 40 and potentiometer 39 may be changed by varying the setting of the potentiometer, thereby initially adjusting the motor speed and the generator output frequency and voltage to desired normal operating values.

If desired, the space current paths of triodes 16 and 18 may be connected across the motor field winding 14 instead of being connected across the field rheostat 15. In this case, however, the connections to the control grid-cathode circuit of tube 33 should be reversed, that is, the common terminal of varistor 46, resistor 40 and condenser 43 should be connected to the control grid and the common terminal of varistor 45, resistor 38 and condenser 43 should be connected to the common terminal of condenser 44 and resistor 41.

What is claimed is:

1. In combination with a source of alternating current the frequency of which may vary over a range from a value below a predetermined frequency to a value above said predetermined frequency, of means for deriving from said source a first unidirectional voltage which increases in magnitude in response to an increase of frequency of said source above said predetermined frequency, means for deriving from said source a second unidirectional voltage which increases in magnitude in response to a decrease of frequency of said source below said predetermined frequency, and means for combining said first and second derived voltages in opposed relationship to set up a resultant voltage equal to the difference of said first and second derived voltages.

2. In combination, an alternating-current generator, an electric motor for driving said generator to cause it to generate an alternating current the frequency of which may vary over a frequency range including frequencies above and below a predetermined frequency, means for deriving from said alternating current a first unidirectional voltage the amplitude of which increases in response to an increase of the frequency of said current above said predetermined frequency, means for deriving from said alternating current a second unidirectional voltage the amplitude of which increases in response to a decrease of the frequency of said current below said predetermined frequency, and means for minimizing frequency changes of said alternating current comprising means responsive to a voltage equal to the difference of said first and second unidirectional voltages for controlling the speed of said motor.

3. In combination with a source of alternating voltage the frequency of which may vary over a range extending from a first relatively low frequency to a second relatively high frequency, of means for deriving from said source a first unidirectional voltage the magnitude of which decreases in response to a frequency increase of said source, means for deriving from said source a second unidirectional voltage the magnitude of which increases in response to a frequency increase of said source, means for combining said first and second derived voltages to obtain a third unidirectional voltage equal to the difference of said first and second voltages, and means responsive to said third voltage for regulating the voltage of said source.

4. In combination, means for generating an alternating voltage the frequency of which may vary, means for deriving from said generated alternating voltage a first unidirectional voltage the magnitude of which decreases in response to a frequency increase of said alternating voltage, means for deriving from said alternating voltage a second unidirectional voltage the magnitude of which increases in response to a frequency increase of said alternating voltage, means for combining said first and second derived voltages in opposition with respect to each other to obtain a third unidirectional voltage equal to the difference of said first and second derived voltages, and means responsive to said third voltage for regulating said alternating voltage generating means.

5. In combination, an electric motor the speed of which may vary, an alternating-current generator driven by said motor, means for deriving from the alternating current produced by said generator a first direct voltage the magnitude of which decreases in response to a speed increase of said motor, means for deriving from said alternating current a second direct voltage the magnitude of which increases in response to a speed increase of said motor, and means responsive to a voltage equal to the difference of said first and second derived voltages for controlling the speed of said motor.

6. In combination, a source of alternating current, a first current path connected to said current source comprising in series resistance and a first tuned circuit resonant at a frequency below the normal frequency of said current source, a second current path connected to said current source comprising in series resistance and a second tuned circuit resonant at a frequency above the normal frequency of said current source, a first and a second rectifying means, a resistive current path, a first circuit comprising in series said first tuned circuit, said first rectifying means and a first portion of said resistive path, a second circuit comprising in series said second tuned circuit, said second rectifying means and a second portion of said resistive path, and means responsive to the voltage across said resistive path for controlling the frequency of the current from said alternating-current source.

7. A combination in accordance with claim 6 in which said alternating-current source comprises an alternating-current generator and an electric motor for driving said generator; and in which said means for controlling the frequency of the current from the alternating-current source comprises means for controlling the speed of said motor.

8. In combination, an alternating-current generator for supplying current to a load, a direct-current motor for driving said generator, said motor having a field winding, a rheostat, means for supplying current from a direct-current source through said rheostat to said field winding, a first space current device having an anode, a cathode and a control electrode, a current path connected across said rheostat comprising the space current path of said first space current device, a second space current device having an anode, a cathode and a control electrode, a circuit connecting the anode and cathode of said second device comprising a source of space current and a resistor, a source of biasing voltage, a circuit connecting the control electrode and cathode of said first device comprising said resistor and said source of biasing voltage, a transformer having a primary winding energized by current from said generator and a secondary winding, three current paths connected across said secondary winding, a first of said current paths comprising in series a first and a second resistor, a second of said current paths comprising in series a third resistor and a first tuned circuit resonant to a frequency below the normal frequency of the current supplied by said generator, a third of said current paths comprising in series a fourth resistor and a second tuned circuit resonant to a frequency above the normal frequency of the current supplied by said generator, a first and a second rectifier, resistance means having two end terminals and a terminal intermediate said end terminals, a current path comprising said first rectifier connecting a first of said end terminals with the common terminal of said third resistor and said first tuned circuit, a current path comprising said second rectifier connecting a second of said end terminals with the common terminal of said fourth resistor and said second tuned circuit, means for conductively connecting said intermediate terminal of said resistance means with the common terminal of said first and second resistors, and a circuit comprising said resistance means connecting the control electrode and cathode of said second space current device.

9. In combination, a source of alternating current the frequency of which may vary from a value below a predetermined frequency to a value above said predetermined frequency, a resistance path having two end terminals and an adjustable tap intermediate said end terminals, means for deriving from said alternating-current source and setting up across a portion of said resistance path between one of said end terminals and said adjustable tap a first unidirectional voltage which increases in magnitude in response to an increase of frequency of said source above said predetermined frequency, means for deriving from said alternating-current source and setting up across the remaining portion of said resistance path between the second of said end terminals and said adjustable tap a second unidirectional voltage of opposite polarity with respect to the first unidirectional voltage in said current path and which increases in magnitude in response to a decrease of frequency of said source below said predetermined frequency, said first and second unidirectional voltages being variable in opposite senses simultaneously by changing the setting of said adjustable tap to thereby vary the resultant unidirectional voltage across said resistance path between said two end terminals, and means responsive to said resultant unidirectional voltage for controlling the frequency of said alternating current.

10. In combination, means for generating an alternating current the frequency of which may vary over a range from a value below said predetermined frequency to a value above said predetermined frequency, a space current device having an anode, a cathode and a control electrode, a circuit connecting the control electrode and cathode of said space current device comprising a resistive path having a first and a second resistive portion, means for deriving from said source and setting up across said first resistive portion a first unidirectional voltage which increases in magnitude in response to an increase of frequency of said source above said predetermined frequency, means for deriving from said source and setting up across said second resistive portion a second unidirectional voltage which increases in magnitude in response to a decrease of frequency of said source below said predetermined frequency, a circuit connecting the anode and cathode of said space current device comprising a source of space current, and means responsive to said space current for controlling said generating means to regulate the frequency of said alternating current.

11. In combination, an alternating-current generator, an electric motor for driving said generator to cause it to generate an alternating current the frequency of which may vary over a frequency range including frequencies above and below a predetermined frequency, means for controlling the energization of said motor to control its speed comprising a space current device having control means for controlling the resistance of the space current path of said device in response to a voltage impressed upon said control means, a resistance path, means for deriving from said alternating current and setting up across different portions respectively of said resistance path opposing unidirectional voltages one of which increases in response to an increase of the frequency of said alternating current above said predetermined frequency and the other of which increases in response to a decrease of the frequency of said alternating current below said predetermined frequency, and means responsive to the resultant voltage across said resistance path for controlling said control means.

References Cited in the file of this patent

UNITED STATES PATENTS

| Number | Name | Date |
|---|---|---|
| 1,552,781 | Von Arco | Sept. 8, 1925 |
| 1,563,140 | Von Arco | Nov. 24, 1925 |
| 1,691,222 | Bohm | Nov. 13, 1928 |
| 1,776,592 | MacDonald | Sept. 23, 1930 |
| 2,344,608 | Haddad | Mar. 21, 1944 |
| 2,496,730 | Lindbeck et al. | Feb. 7, 1950 |